United States Patent
Bailey, III et al.

(10) Patent No.: US 9,682,652 B2
(45) Date of Patent: Jun. 20, 2017

(54) VEHICLE ACOUSTIC APPARATUS, AND METHODS OF USE AND MANUFACTURE THEREOF

(71) Applicant: Honda Motor Co., Ltd., Tokyo (JP)

(72) Inventors: Rick Bailey, III, Raymond, OH (US);
Steve Turner, Marysville, OH (US);
Steve Eich, Raymond, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/876,650

(22) Filed: Oct. 6, 2015

(65) Prior Publication Data

US 2017/0096101 A1    Apr. 6, 2017

(51) Int. Cl.
*G06F 7/00* (2006.01)
*B60Q 9/00* (2006.01)
*G10K 11/18* (2006.01)
*F16H 63/40* (2006.01)
*F01N 1/06* (2006.01)

(52) U.S. Cl.
CPC .............. *B60Q 9/00* (2013.01); *F01N 1/065* (2013.01); *F16H 63/40* (2013.01); *G10K 11/18* (2013.01)

(58) Field of Classification Search
CPC   B60Q 9/00; F01N 1/065; B60T 8/172; B60R 16/0315
USPC .......... 701/36, 41; 381/86, 71.4; 340/384.3; 181/175, 250
See application file for complete search history.

(56) References Cited

U.S. PATENT DOCUMENTS 8,322,486 B2    12/2012  Ohta et al.
8,938,079 B2 *   1/2015  Valeri ................... G10K 15/02
                                              340/384.3
(Continued)

FOREIGN PATENT DOCUMENTS

EP    1138887 A2    10/2001
EP    1865494 A1    12/2007
(Continued)

OTHER PUBLICATIONS

Extended European Search Report issued Mar. 22, 2017 in EP 16 19 2677.9 (in English).

*Primary Examiner* — Shardul Patel
(74) *Attorney, Agent, or Firm* — Kenealy Vaidya LLP

(57) ABSTRACT

Some embodiments are directed to a control system for a sound controller configured to transmit sounds to a vehicle passenger cabin. The system includes a downshift sensor configured to detect a downshift of a vehicle transmission, and an accelerator pedal sensor that is configured to detect whether an accelerator pedal is actuated above a predetermined threshold. A controller controls operation of the sound controller in accordance with a sound control logic that is based on vehicle engine mode, transmission gear selection, accelerator pedal position, and vehicle engine speed. The controller also controls operation of the sound controller in accordance with an audible downshift logic if the downshift sensor detects a downshift of the vehicle transmission and the accelerator pedal sensor detects that the accelerator pedal is not actuated above the predetermined threshold, the audible downshift logic controlling the sound controller to enhance engine sound transmitted to the passenger cabin.

20 Claims, 9 Drawing Sheets

(56) References Cited

U.S. PATENT DOCUMENTS

| | | | |
|---|---|---|---|
| 2002/0039422 A1* | 4/2002 | Daly | G10K 11/1788 381/71.4 |
| 2002/0121254 A1* | 9/2002 | Yamauchi | F01L 1/3442 123/90.17 |
| 2005/0121254 A1 | 6/2005 | Hofmann et al. | |
| 2005/0121255 A1* | 6/2005 | Hofmann | F02M 35/1294 181/250 |
| 2008/0192954 A1* | 8/2008 | Honji | G10K 15/04 381/86 |
| 2012/0203424 A1* | 8/2012 | Filev | B60W 50/00 701/36 |
| 2013/0199487 A1* | 8/2013 | Bernard | F02B 27/001 123/184.53 |
| 2014/0121896 A1 | 5/2014 | Valeri et al. | |
| 2014/0229076 A1 | 8/2014 | Doering et al. | |
| 2014/0284136 A1* | 9/2014 | Takahashi | F02M 35/1294 181/175 |
| 2014/0350789 A1* | 11/2014 | Anker | B62D 15/025 701/41 |
| 2015/0016627 A1* | 1/2015 | Barlow, Jr. | B60Q 9/00 381/86 |

FOREIGN PATENT DOCUMENTS

| | | |
|---|---|---|
| EP | 2534348 A1 | 12/2012 |
| EP | 2534348 B1 | 7/2014 |
| WO | 2011113910 A1 | 9/2011 |

* cited by examiner

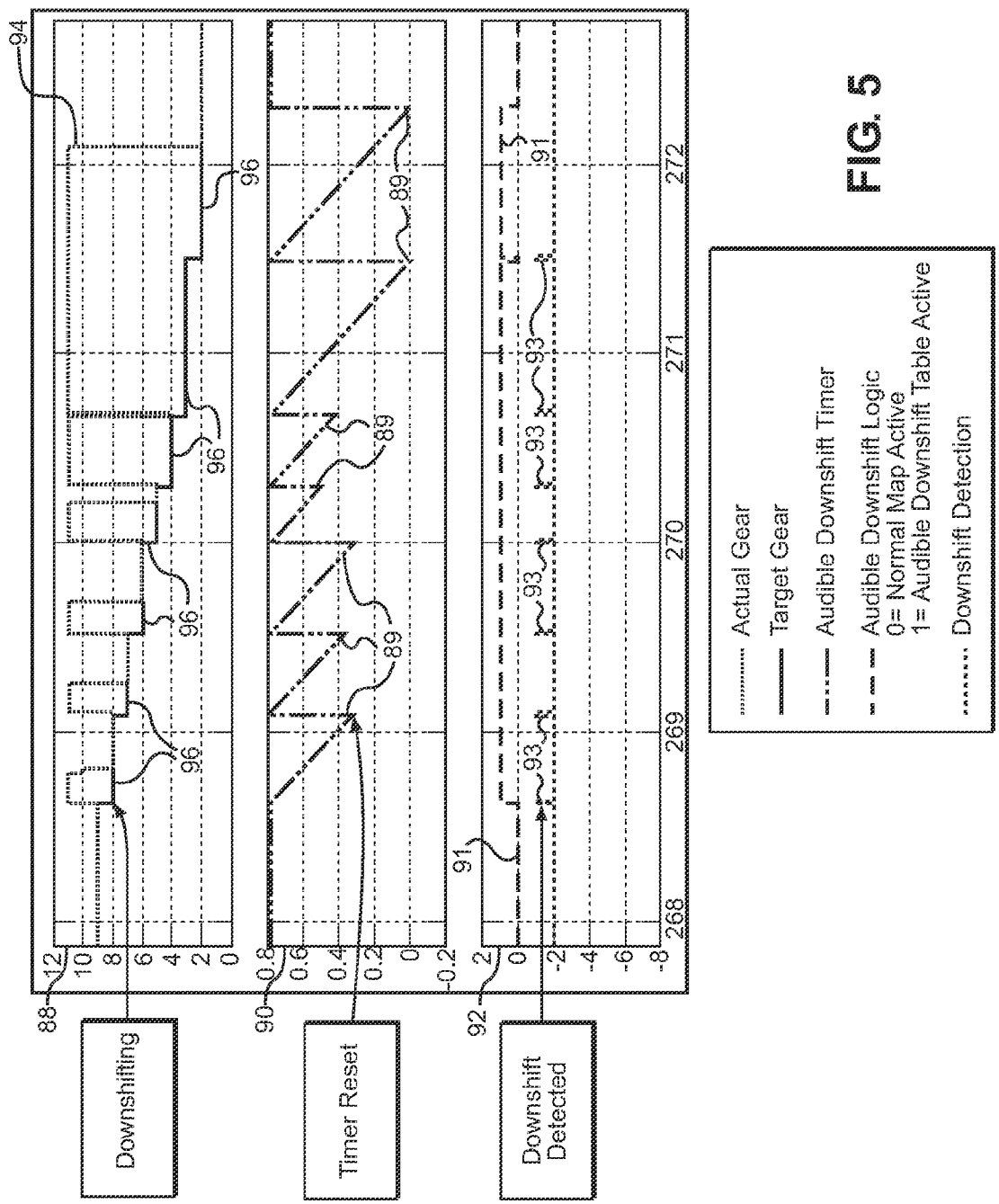

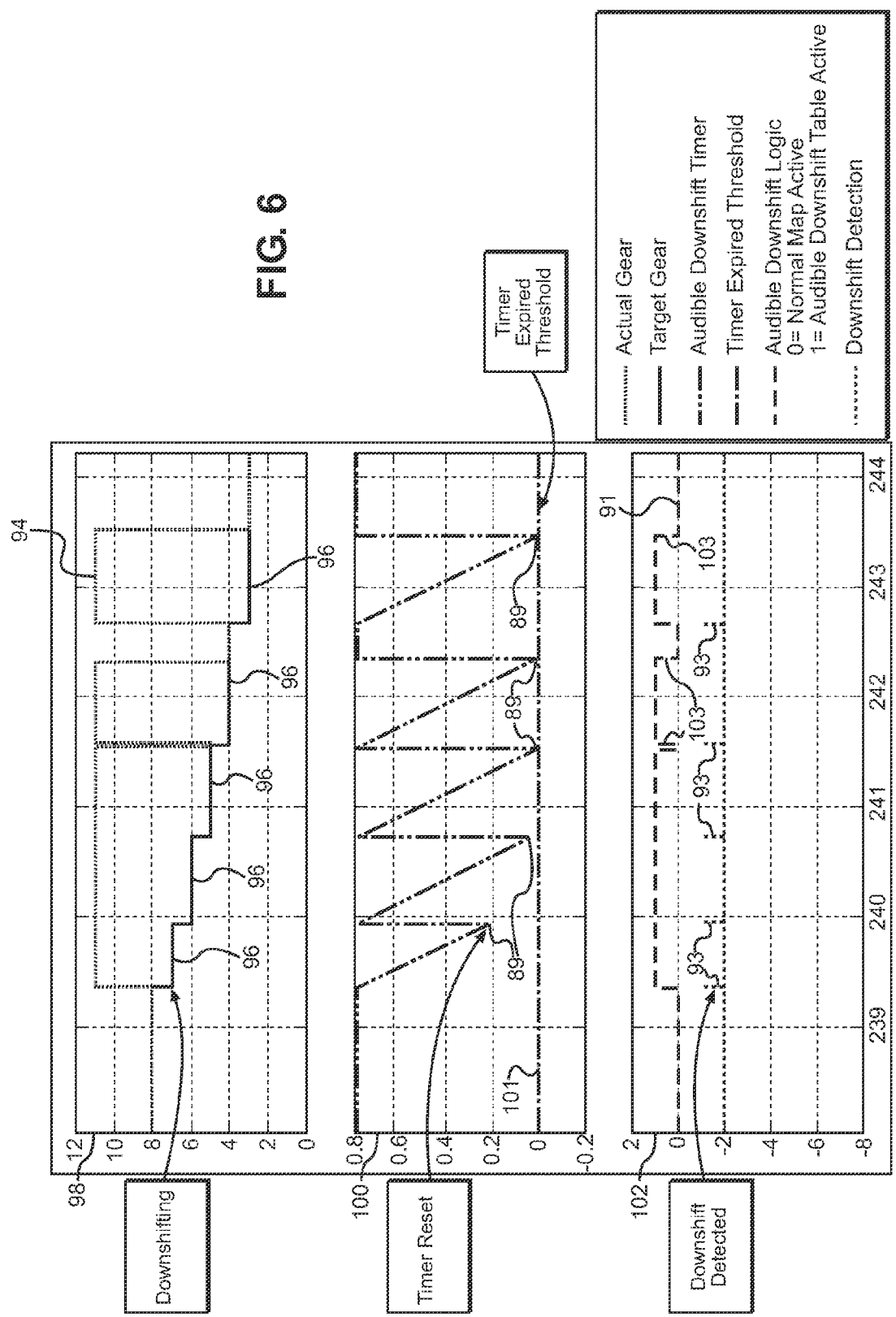

VEHICLE ACOUSTIC APPARATUS, AND METHODS OF USE AND MANUFACTURE THEREOF

BACKGROUND

The disclosed subject matter relates to vehicle acoustic apparatus, and methods of use and manufacture thereof. More particularly, the disclosed subject matter relates to methods and apparatus for affecting sounds generated by a vehicle's engine.

The interactions and operations of various components of complex or semi-complex machinery often generate sounds. For example, the operations of internal combustion engine and the gases flowing into and out of the engine, such as for a vehicle, generate sounds that can be perceived by vehicle occupants as well as others disposed outside of the vehicle's passenger compartment (e.g., vehicle cabin). These sounds can vary, and different sounds or magnitudes of the sounds can specifically correspond to certain operations.

SUMMARY

As one example, increasing aspects of the engine output, measured in revolutions per minute (RPM), may cause sounds generated by the engine to increase in magnitude, while decreasing the engine output may have the opposite effect. Similarly, the engine sounds may vary depending on the gear ratio selected in the multi-speed gear transmission, i.e., the sounds generated when a certain gear ratio is selected may be different than those generated when a different gear ratio is selected.

Certain vehicle engines may also operate in different modes, and the engine sounds generated during operation may be dictated based at least in part by the mode in which the vehicle is operating. For example, some vehicle engines can be manually actuated into either a sport mode, track mode, normal mode, quiet mode, etc., wherein certain engine performance characteristics are enhanced in either the sport or track mode. The engine sounds generated in the sport or track mode can be different in certain respects than when the engine is operating in the normal or quiet mode. In some cases, the engine sounds generated in the sport or track mode may be louder, and/or correspond to sounds that are typically associated with high performance vehicles, e.g., sport cars, race cars, etc.

This concept may be referred to as sport sound, and can involve varying the engine sound that is perceived by vehicle occupants inside the vehicle cabin depending on various factors, including the mode in which the vehicle is currently engaged (e.g., sport mode, track mode, normal mode, quiet mode, etc.). As discussed above, the vehicle is configured so that the engine sound in the vehicle cabin is louder when the vehicle is engaged in sport and track modes, but quieter when the vehicle is engaged in a quiet or normal mode.

The vehicle engine sounds perceivable within the vehicle cabin can be used by a vehicle operator to provide feedback as to the engine's performance and operation, and may enable the vehicle operator to feel more connected to the vehicle's operation. As one example, engine noise that increases in volume may provide feedback to the vehicle operator of an increase in an engine performance characteristic (such as RPM). As another example, it may be advantageous for the vehicle operator and/or an observer inside or outside of the vehicle to perceive an enhanced acceleration of the vehicle based on the sounds generated by the engine as a function of the gear ratio selected in the transmission. Specifically, it can be advantageous to enhance the perceived engine noise when a lower gear ratio(s) is selected because the vehicle can accelerate at a higher rate than when a higher gear ratio is selected. Thus, a relatively louder engine speed can be associated with a higher acceleration of the vehicle. Failure to perceive certain engine sounds may have the opposite effect, and may cause the vehicle operator to feel disconnected from the vehicle's operation.

The sounds naturally generated by vehicle engines may not always be sufficient to provide vehicle operators with sufficient feedback to feel connected to the vehicle operation, such as when operating the vehicle in the sport or track mode where vehicle performance is heightened. As one example, insufficient feedback may be provided during off-throttle downshifts, i.e., where acceleration is not applied while down-shifting gears of the transmission. In other words, sufficient engine sound may not naturally be transmitted to the vehicle cabin during off-throttle downshifts, which results in the vehicle occupants feeling disconnected from the vehicle operation.

It may therefore be beneficial to provide an acoustic apparatus to effectively communicate an appropriate amount of sound to the vehicle cabin under various circumstances, including during off throttle downshifts. For example, it may be beneficial to provide a controller that is configured to cause the acoustic apparatus to vary the amount of engine sound that is communicated to the vehicle cabin based on the engine mode, gear, acceleration pedal position, and/or engine speed. Maps or a group of tables may be used to take these factors into account to determine an acceptable amount of engine sound to be transferred to the vehicle cabin.

The acoustic apparatus may include a sound intake valve, piping, a sound symposer having a diaphragm, and an Electronic Control Unit (ECU) that controls the sound intake valve. In some embodiments, vibrations from the engine air intake passage travel through the sound intake valve, and vibrate against one side of the diaphragm of the sound symposer. An opposite side of the diaphragm can be connected to two pipes that extend into the vehicle cabin, such that one pipe terminates adjacent the driver's side while the other terminates adjacent the passenger's side. In operation, vibrations travel from the diaphragm, through the two pipes, and into the vehicle cabin to enable vehicle occupants to hear the engine sound, the amount of which is determined based on the opening and closing of the valve.

In particular, intake air can be piped from the environment to the engine, and the amount of air provided to the engine can be regulated by a throttle valve that is controlled by the vehicle driver via an accelerator pedal, such that depressing the accelerator pedal causes the throttle valve to open and thereby supply more air to the engine. Air can be diverted prior to reaching the throttle valve, and the diverted air can be piped to an intake sound valve. This valve controls the amount of air, and in particular sound pulsations, that are to be transferred to the vehicle cabin. The intake sound valve can perform this operation, i.e., the transfer of sound pulsations, as a controller-actuated device.

Opening and closing of the intake sound valve can be controlled by the ECU so as to act as a volume control for intake sound to be supplied to the vehicle cabin. For example, opening the intake sound valve can result in the supply of more air pressure and thus more sound to the cabin, while closing this valve can have the opposite effect. The air that passes through the intake sound valve can be piped to the sound symposer, which as indicated above includes the diaphragm. The diaphragm can separate the intake air provided through the intake sound valve from air within the vehicle cabin, and can allow sound in the form of intake pulses to transfer. The sound symposer can be configured to be a controller-actuated device, and is tunable to enable achievement of a sound target.

The ECU can open and close the intake sound valve by an amount that is determined to be appropriate based on the engine mode, gear, acceleration pedal position, and/or engine speed. The opening and closing of the intake sound valve, which determines the amount of sound communicated to the vehicle cabin, can thereby be regulated based on the ECU's logic tables.

The ECU's logic can select (via an Audible Downshift activation logic) an Audible Downshift table if a downshift is detected, and this table can remain active until at least one of the following events occurs: 1) a timer runs out (which is set in calibration), 2) an upshift is detected, or 3) the acceleration pedal is actuated above a certain threshold. In one aspect, the timer resets every time a downshift is detected. This Audible Downshift table can be designed to provide sufficient feedback during off throttle downshifts, and in particular to control the intake sound valve (such as by opening the valve) to transmit sufficient engine sound to the vehicle cabin so that the vehicle occupants feel connected to the vehicle operation. In particular, the vehicle occupants can hear the downshift, which allows them to feel more connected to the vehicle by understanding the engine response exactly when the downshift has taken place.

In other words, the software logic (which can be referred to as Audible Downshift) enhances engine sound response during off throttle downshifts by controlling the intake sound valve based on the Audible Downshift table when the Audible Downshift logic is active. This Audible Downshift logic activates when a downshift is detected, and remains active until at least one of the three conditions listed above occurs. The criteria for detecting a downshift is based on at least a determination that: 1) the target gear value of the current CPU cycle is less than the target gear value of the previous CPU cycle, 2) the target gear selection is not reverse, and 3) the target gear selection is not neutral.

Some embodiments are therefore directed to a control system for use with a sound controller that is configured to transmit sounds to a passenger cabin of a vehicle. The vehicle can include a transmission having multiple gears and being controllable to select a different gear resulting in either an upshift or a downshift, and an accelerator pedal that is configured to be manually actuated to control a throttle valve to regulate a supply of air to an engine. The vehicle engine can be operable in multiple different modes and engine speeds.

The control system can include a downshift sensor configured to detect a downshift of the vehicle transmission; and an accelerator pedal sensor that is configured to detect whether the accelerator pedal is actuated above a predetermined threshold. A controller can be configured to control operation of the sound controller in accordance with a sound control logic that is based on vehicle engine mode, transmission target gear selection, accelerator pedal position, and vehicle engine speed. The controller can also be configured to control operation of the sound controller in accordance with an audible downshift logic if the downshift sensor detects a downshift of the vehicle transmission and the accelerator pedal sensor detects that the accelerator pedal is not actuated above the predetermined threshold, the audible downshift logic controlling the sound controller to enhance engine sound transmitted to the passenger cabin.

Some other embodiments are directed to an acoustic system for use with a vehicle defining a passenger cabin. The vehicle can include a transmission having multiple gears and being controllable to select a different gear resulting in either an upshift or a downshift, and an accelerator pedal that is configured to be manually actuated to control a throttle valve to regulate a supply of air to an engine. The vehicle engine can be operable in multiple different modes and engine speeds.

The acoustic system can include a sound controller that is configured to transmit sounds to a passenger cabin of a vehicle; and a control system. The control system can include: a downshift sensor configured to detect a downshift of the vehicle transmission; an accelerator pedal sensor that is configured to detect whether the accelerator pedal is actuated above a predetermined threshold; and a controller that can be configured to control operation of the sound controller in accordance with a sound control logic that is based on vehicle engine mode, transmission target gear selection, accelerator pedal position, and vehicle engine speed. The controller can also be configured to control operation of the sound controller in accordance with an audible downshift logic if the downshift sensor detects a downshift of the vehicle transmission and the accelerator pedal sensor detects that the accelerator pedal is not actuated above the predetermined threshold, the audible downshift logic controlling the sound controller to enhance engine sound transmitted to the passenger cabin.

Still other embodiments are directed to a method of transmitting sounds to a passenger cabin of a vehicle. The vehicle can include a transmission having multiple gears and being controllable to select a different gear resulting in either an upshift or a downshift, and an accelerator pedal that is configured to be manually actuated to control a throttle valve to regulate a supply of air to an engine. The vehicle engine can be operable in multiple different modes and engine speeds.

The method can include: detecting a downshift of the vehicle transmission; detecting whether the accelerator pedal is actuated above a predetermined threshold; controlling operation of the sound controller in accordance with a sound control logic that is based on vehicle engine mode, transmission target gear selection, accelerator pedal position, and vehicle engine speed; and controlling operation of the sound controller in accordance with an audible downshift logic if the downshift sensor detects a downshift of the vehicle transmission and the accelerator pedal sensor detects that the accelerator pedal is not actuated above the predetermined threshold, the audible downshift logic controlling the sound controller to enhance engine sound transmitted to the passenger cabin.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a series of time-coordinated graphs depicting timer resets after each of a series of downshift events are detected in accordance with the disclosed subject matter.

FIG. 6. is a series of time-coordinated graphs depicting timer expiration periods stopping audible downshift processes.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Exemplary Powertrain

Figure 1:
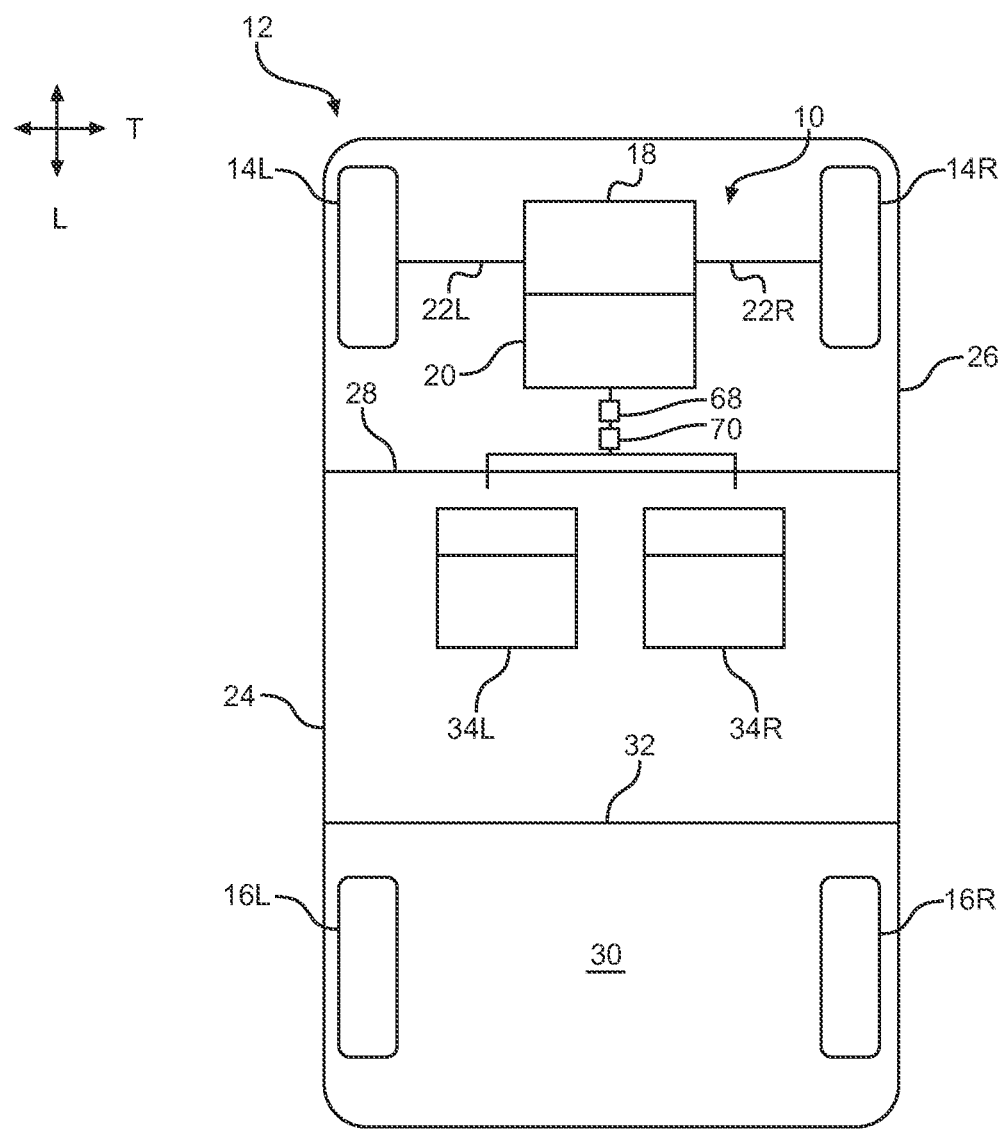
FIG. 1 is a schematic view of a powertrain for a vehicle in accordance with the disclosed subject matter.

FIG. 1 is a schematic view of a powertrain for a vehicle in accordance with the disclosed subject matter. FIG. 1 illustrates an embodiment of a powertrain 10 for a vehicle 12, where the vehicle 12 has a longitudinal direction L and a transverse direction T perpendicular to the longitudinal direction. The powertrain 10 can be configured as an on-demand, part-time, or all-wheel drive system in accordance with principles of the disclosed subject matter. However, exemplary embodiments are intended to include or otherwise cover other powertrain configurations.

This exemplary powertrain 10 can be configured such that a pair of steerable front wheels 14L, 14R are the primary drive wheels, and a pair of rear wheels 16L, 16R are automatically selectively driven when additional tractive effort is advantageous for the given vehicle conditions. However, the powertrain 10 can also be configured such that the rear wheels 16L, 16R are the primary drive wheels and the front wheels 14L, 14R are driven to supplement the tractive effort. In other embodiments, the powertrain 10 can be configured as: a full-time all-wheel drive system; a manually-engagable, part-time all-wheel drive system; a front-wheel drive system; or a rear-wheel drive system.

The powertrain 10 can include the pair of front wheels 14L, 14R, the pair of rear wheels 16L, 16R, a power source 18, a transmission 20, and a pair of front driveshafts 22L, 22R, all arranged in any appropriate manner.

The transmission 20 can include a plurality of gears that can be selectively engaged/disengaged in different combinations to create a respective plurality of gear ratios. For example, the transmission 20 can include gear numbers 1, 2, ... n, and the gear numbers 1, 2, ... n can be engaged with one or more respective gears of the plurality to provide a first gear ratio, second gear ratio, ... n gear ratio. The gear number can be any appropriate integer number. Embodiments are intended to include a sliding gear transmission, or a constant mesh transmission.

The value of the gear number can be different from the value of the corresponding gear ratio. The gear ratio number can be any appropriate rational number. In an exemplary embodiment, the transmission 20 can have n gear ratios that decrease in numerical value as the gear number increases in numerical value. For example, the gear having a gear number value of 1 ("first gear") can have a gear ratio value of 3.46:1; a gear having a gear number value of 2 ("second gear") can have a gear ratio value of 1.47:1, and the $n^{th}$ gear can have an $n^{th}$ gear ratio of 0.73:1.

The gear number currently engaged in the transmission 20 can be referred to as the actual gear number. The gear number that the transmission will shift to can be referred to as the target gear number. If the transmission 20 shifts from an actual gear number to a target gear number that has a greater numerical value than that for the actual gear number, then the shift can be referred to as an upshift. For example, a shift from the first gear number to the second gear number is an upshift. If the transmission 20 shifts from the actual gear number to a target gear number that has a lesser numerical value than that for the actual gear number, then the shift can be referred to as a downshift. For example, a shift from the $n^{th}$ gear number to the third gear number is a downshift.

The vehicle 12 can include an interior cabin 24 that is separated from an engine compartment 26 by a front bulkhead 28 and is separated from a trunk compartment 30 by a rear bulkhead 32. The front bulkhead 28 and the rear bulkhead 32 can include noise and vibration dampening materials of construction that can create noise and vibration barriers between the engine compartment 26, the cabin 24, and the trunk compartment 30. The cabin 24 can include a pair of seats 34L, 34R disposed on a left side of the cabin 24 a right side of the cabin 24. In an embodiment, an operator of the vehicle 12 can occupy the left seat 34L as a driver's seat and a passenger can occupy the right seat 34R as a passenger seat. In other embodiments, the positions can be reversed where an operator occupies the right seat 34R and a passenger occupies the left seat 34L.

II. Engine Sound Requirements

Figure 2:
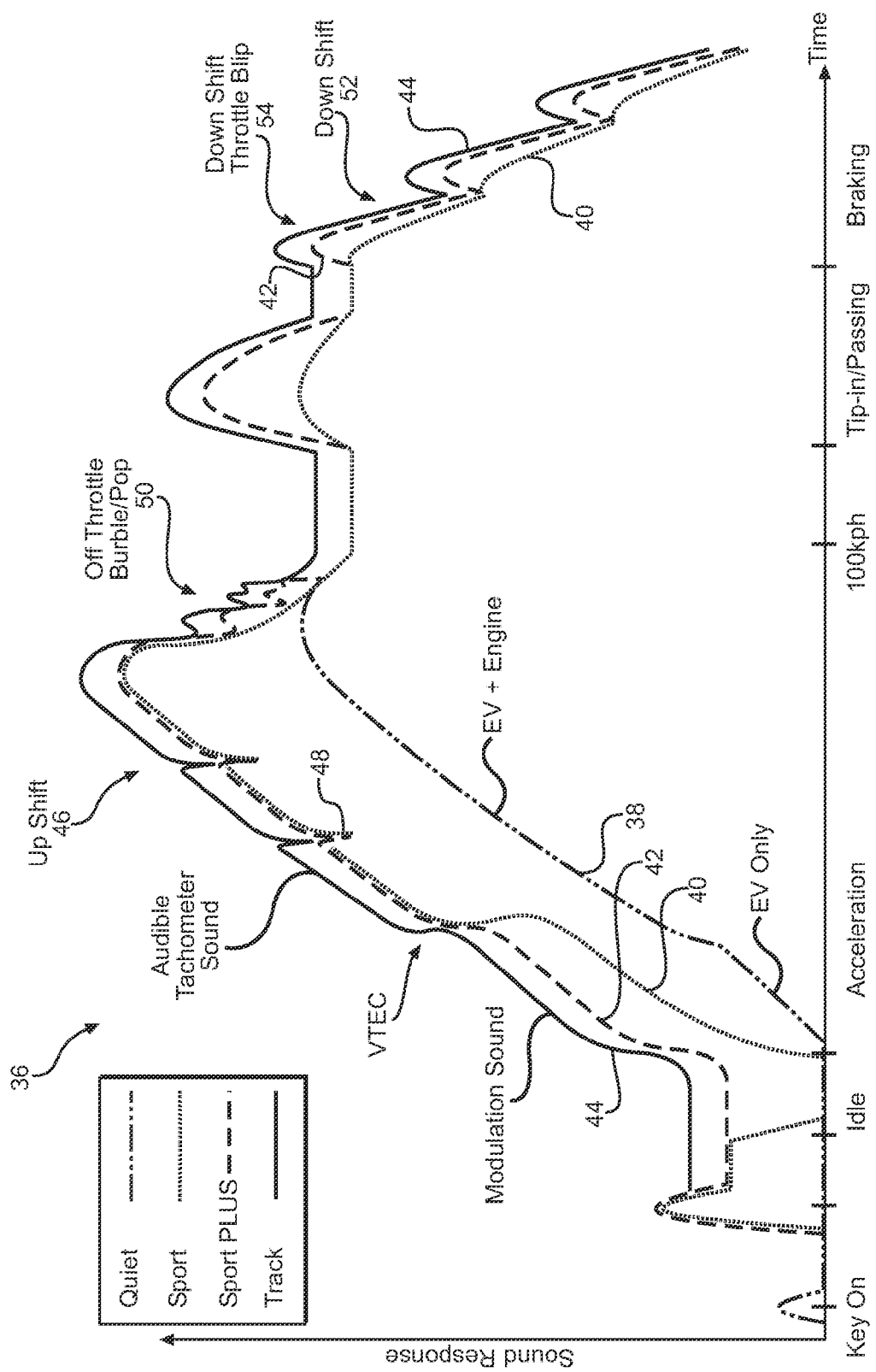
FIG. 2 is a graph depicting plots of Integrated Dynamics System (IDS) mode interior cabin sound level changes for various engine and transmission states of the vehicle 12.

FIG. 2 is a graph depicting plots of Integrated Dynamics System (IDS) mode interior cabin sound level changes for various engine and transmission states of the vehicle 12. The plots include IDS mode interior sound level changes versus time for various engine states including idle, acceleration, a certain exemplary speed, tip-in/passing, and braking. The concept of sport sound is based on varying the engine sound that is perceived by vehicle occupants inside the vehicle cabin 24 depending on various factors, including the IDS mode in which the vehicle 12 is currently engaged. In general, the vehicle 12 is configured so that the engine sound in the vehicle cabin 24 is louder when the vehicle 12 is engaged in sport and track IDS modes, but quieter when the vehicle 12 is engaged in an IDS quiet mode (e.g., EV (environmental or all-battery mode) or EV plus engine-assist mode).

In an embodiment, the IDS can provide one or more driving modes for a driver's desire for vehicle driving performance. In a normal driving mode, the exemplary Intake Sound Controller (ISC) system of the embodiments (described more fully in FIGS. 3-4) gathers data from the target gear in a certain IDS mode, an engine speed, and an accelerator pedal position, and compares the data to a map of predetermined target positions of an ISC valve, and then opens and closes the valve to the mapped target position that matches current data. The ISC valve permits sound pulses from the engine to enter the vehicle cabin where it can be heard by vehicle occupants.

The graph 36 in FIG. 2 depicts lines representing examples of sound responses from an engine over time from a vehicle currently operating in each of four exemplary IDS modes: Quiet 38, Sport 40, Sport Plus 42, and Track 44. The sound responses can correlate to ISC valve target positions for the different IDS modes. During a startup symphony phase between Key On and Idle, the Sport, Sport Plus, and Track modes provide some minimal rising sound response. In normal operations, the Quiet mode closes the ISC valve so that no sound response is returned from the engine 18 to the cabin 24 using the ISC system. Alternatively, the Quiet mode can use a Quiet mode map to return lower levels of sound to the vehicle cabin 24 than other modes, which what is shown in the plot of FIG. 2.

During an Acceleration phase, the sound response lowest for the vehicle 12 is engaged in the Quiet mode, whereas the Sport, Sport Plus, and Track modes are distributed with varying degrees of rising modulated sounds, the Sport mode being the lowest and the Track mode being the highest sound response. As the vehicle 12 accelerates, the sound response rises in each successive upshift 46 for the three performance modes (e.g., Sport, Sport Plus, Track) but the upshifts are interposed with a temporary reduction 48 of the sound response caused by a reduction in engine speed between upshifts when the target gear is initially engaged by the transmission 20. In the Acceleration phase, the Quiet mode transitions at a certain point from EV mode to an EV Plus Engine mode, where an engine-assist system can power the vehicle 12 that was formerly operating in a battery-only mode. The EV Plus Engine sound response can be a steady rise through the successive upshift events with lower sound responses than the performance modes.

After reaching a peak acceleration, the vehicle 12 can enter a Cruising phase, in which the operator releases the accelerator pedal and settles to a cruising speed of 100 kph. A release of the accelerator pedal causes a sharp reduction in the throttle, thereby causing an off throttle burple or pop noise 50 from the engine 18 for each IDS performance mode. However, the Quiet mode sound response lowers through a smooth transition to a steady sound response without burple or pop responses from the engine 18. The vehicle 12 may accelerate to pass another vehicle, which causes a temporary rise in engine sound response in all modes (due to a rise in the engine speed), but is more accentuated in the performance modes.

During a Braking phase, the vehicle 12 slows and the driver can downshift (or alternatively, an automatic transmission can downshift) through a series of successive off throttle downshift events 52, causing a fall in the sound responses in each IDS mode. Interposed between the successive off throttle downshift events 52 are downshift throttle blips 54 that can occur as the initial engagement of a target lower gear causes a temporary rise in the engine speed.

As described above, related art systems are deficient under certain circumstances, such as during off throttle downshift events, i.e., where acceleration is not applied while down-shifting gears of the transmission. The related art systems fail to provide the vehicle occupants with sufficient feedback, and in particular sufficient engine sound is not transmitted to the vehicle cabin, which results in the vehicle occupants feeling disconnected from the vehicle operation. In other words, the related art systems' sound response is not sufficiently strong during off throttle downshift events.

Figure 3:
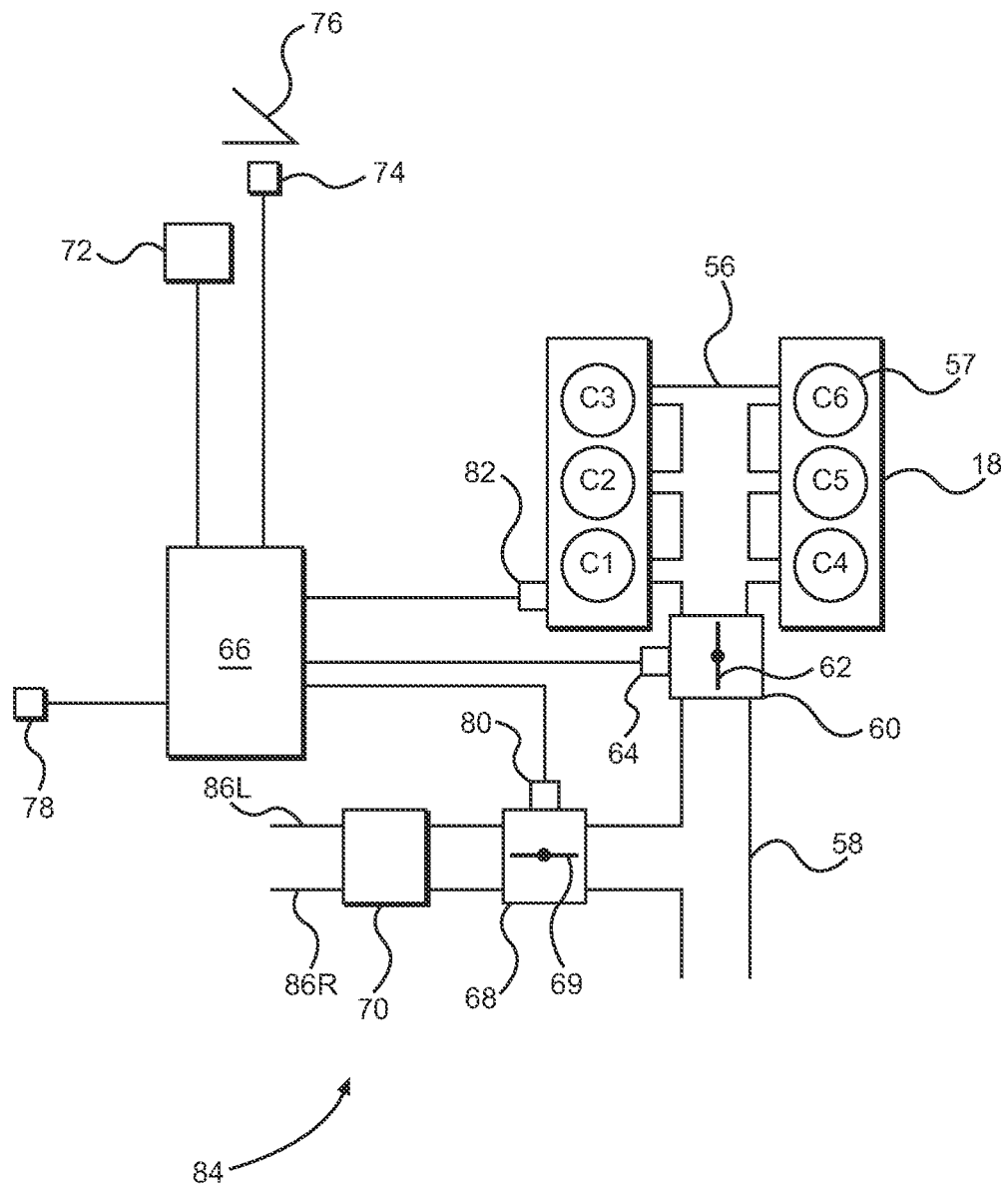
FIG. 3 is a schematic view of an internal combustion engine to which a control system can be applied according to the disclosed subject matter.

FIG. 3 is a schematic view of an internal combustion engine to which a control system can be applied according to the disclosed subject matter. As shown in FIG. 3 the engine 18 can include a plurality of combustion cylinder assemblies 57 (e.g., C1, C2, C3, C4, C5, C6) arranged in two banks of three assemblies each. The engine 18 can include one or more combustion cylinder assemblies 57 of an even count or of an odd count. Although the combustion cylinder assembly 57 of FIG. 3 is illustrated in a V-6 engine configuration, the arrangement of combustion cylinder assemblies 57 is merely exemplary. The embodiments are intended to include or otherwise cover the engine 18 with any number of cylinder assemblies 57 in any configuration. Additionally, the embodiments are intended to include or otherwise cover engine cylinders arranged in "V" pattern or a "W" pattern, arranged in pair of horizontally opposed banks, arranged in a single row, or arranged in any other appropriate configuration. any type of engine for a vehicle such as, but not limited to, V Thus, exemplary embodiments are intended to include or otherwise cover any appropriate number and arrangement of the cylinder assemblies 57.

An intake manifold 56 can be in selective fluid communication with each of the cylinders C1, C2, C3, C4, C5, C6. An intake conduit 58 can be in fluid communication with the ambient air outside of the vehicle 12. A throttle assembly 60 can be connected between the intake manifold 56 and the intake conduit 58. Although FIG. 3 illustrates a single intake manifold 56, the embodiments are intended to include or otherwise cover any appropriate device(s) or system that can provide oxygen alone, or a mixture of oxygen and fuel, to one or more of the combustion cylinder assemblies 57. For example, an individual air intake device(s) or system(s) can be placed in fluid communication with a respective combustion cylinder assembly 57. In another example, a first air intake device or system can be in fluid communication with a first set of combustion cylinder assemblies, and a second air intake device or system can be in fluid communication with a second set of combustion cylinder assemblies, and so on, as deemed appropriate. The air intake device(s) or system(s) can include any appropriate structure(s) and/or component(s) and/or system(s) that can alter or enhance any one of or any combination of volumetric efficiency, air/fuel mixing, mass flow rate, pressure pulse control, etc.

The throttle assembly 60 can include a movable throttle valve 62 and a throttle position sensor 64. The throttle valve 62 can be movably mounted to selectively open and close fluid communication between the intake conduit 58 and the intake manifold 56. The throttle position sensor 64 can be configured to output data indicative of the angular position of the throttle valve 62 that can be expressed as a percentage of the wide open throttle position (WOT). FIG. 3 shows the throttle valve 62 in the wide open throttle position. Although FIG. 3 shows a throttle valve 62, exemplary embodiments are intended to include air intake devise(s) or system(s) that can regulate the flow of intake air into the combustion cylinder assemblies 57 without the use of a throttle assembly 60. For example, one or more of the engine's intake valves can be operated to regulate the flow of air into the respective combustion cylinder.

III. Intake Sound Controller System

The intake sound controller (ISC) system 84 of the embodiments can include a controller 66, such as an electronic control unit (ECU), a sound intake assembly 68 that includes an intake sound valve 69, and a sound processor 70 (e.g., sound symposer or the like) that includes a diaphragm (not shown). In the exemplary embodiments, the controller 66 can be configured to receive data from a gear sensor 72 associated with the transmission 20, a pedal position sensor 74 associated with an accelerator pedal 76, an IDS mode selector 78 that can include a database of IDS modes, a valve position sensor 80 associated with the intake sound valve 69, and an engine speed sensor 82 associated with the engine 18. The controller 66 can be in electrical communication with the sensor(s) described above and/or other controller(s) and sensor(s) associated with the engine 18, transmission 20, and the ISC system 84.

For example, the controller 66 is in electrical communication with one or more other vehicle systems and/or sensor(s) that can provide data indicative of vehicle dynamic conditions. These conditions include, but are not limited to, yaw angle, yaw rate, roll rate, acceleration in the transverse direction T (i.e., lateral acceleration), steering angle, steering angle rate, brake force, brake pedal position, suspension loads, cargo load, trailer load, air temperature, surface condition(s) (such as but not limited to dry, wet, snowy, icy, surfaces), and surface type (such as but not limited to paved, gravel, sand, dirt, mud, rocky, rutted surfaces).

The gear sensor 72 can be configured to output data indicative of a target gear of the transmission 20 that is selected by the operator of the vehicle. The pedal position sensor can be configured as a device to output data indicative of the position of the accelerator pedal 76. Exemplary embodiments are intended to include or otherwise cover sensors 72, 76 that can be configured to output raw data to the controller 66 for processing by the controller. Exemplary embodiments also are intended to include or otherwise cover sensors 72, 76 that can be configured to collect raw data, process the raw data, and output processed data to the controller 66.

The controller 66 can control the intake sound valve 69 to vary the amount of engine sound that is communicated to the vehicle cabin 24 based on data received related to the IDS mode (activated by the IDS mode selector 78), a transmission target gear from gear sensor 72, the acceleration pedal position from the pedal position sensor 74, and engine speed from the engine speed sensor 82. The IDS mode selector 78 can be electrically connected to the controller 66 and can include an electronic switch that can be manually selected by a vehicle driver. The controller 66 can receive a signal from the IDS mode selector 78 and activate the corresponding software and control commands for one of the Quiet, Sport, Sport Plus, or Track modes, or any other configurable modes as desired. The gear sensor 72 can be electrically connected to the controller 66 and transfer data and/or signals of the current and/or target gear of the transmission 20 to the controller 66. The pedal position sensor 74 can be electrically connected to the controller 66 and can transfer data and/or signals of the current accelerator pedal position. The engine speed sensor 82 can be electrically connected to the controller 66 and can transfer data and/or signals of the current engine speed in revolutions per minute (RPM) to the controller 66.

In the embodiments, sound vibrations from the engine intake conduit 58 can travel through the sound intake assembly 68 and vibrate against one side of the diaphragm of the sound processor 70. An opposite side of the diaphragm of the sound processor 70 can be connected to at least one pipe 86L that extends into the vehicle cabin 24. In other embodiments, the opposite side of the diaphragm of the sound processor 70 can be connected to two or more pipes 86L, 86R that extend into the vehicle cabin 24 such that one pipe 86L terminates adjacent the driver's side or left seat 34L while the other pipe 86R terminates adjacent the passenger's side or right seat 34R. In operation, sound vibrations travel from the diaphragm, through the two pipes 86L, 86R, and into the vehicle cabin 24 to enable vehicle occupants to hear the engine sound, the amount of which can be determined based on the opening and closing of the intake sound valve 69.

In one embodiment, intake air can be piped through intake conduit 58 and regulated by the throttle valve 62 to the intake manifold 56, and to the combustion cylinder assemblies 57. The throttle valve 62 is controlled by the vehicle driver via the accelerator pedal 76, such that depressing the accelerator pedal causes the throttle valve to open and thereby supply more intake air to the cylinder assemblies 57. As illustrated in FIG. 3, intake air is partially diverted prior to reaching the throttle assembly 60, and the diverted intake air is piped to the sound intake assembly 68. The intake sound valve 69 of the sound intake assembly 68 can control the amount of intake air, and in particular sound pulsations emanating from the engine 18, that are to be transferred to the vehicle cabin 24 via the sound processor 70. The intake sound valve 69 can perform this operation, i.e., the transfer of sound pulsations, as a controller-actuated device.

In operation, opening and closing of the intake sound valve 69 is controlled by the controller 66 so as to act as a volume control for intake sound to be supplied to the vehicle cabin. For example, opening the intake sound valve 69 results in the supply of more intake air to the sound processor 70 and thus more sound to the cabin 24, while closing the intake sound valve 69 has the opposite effect. The intake air that passes through the intake sound valve 69 is piped to the sound processor 70, which as indicated above includes a diaphragm. The diaphragm separates the intake air provided through the intake sound valve 69 from air supplied to the vehicle cabin 24, but allows sound in the form of pulses or vibrations to transfer from the intake conduit 58 to the vehicle cabin 24. The sound processor 70 can be configured to be a controller-actuated device, and is tunable to enable achievement of a sound target.

II. Exemplary Algorithm for Audible Downshift Activation

The controller 66 can contain one or more maps or group of tables that takes data from the transmission target gear, the accelerator pedal position, the engine speed, and the operator-selected IDS mode and factors the data to determine an acceptable amount of engine sound to be transferred to the vehicle cabin 24. The controller 66 opens and closes the intake sound valve 69 by an amount that is determined to be appropriate based on the IDS mode, gear, acceleration pedal position, and engine speed.

Figure 4A:
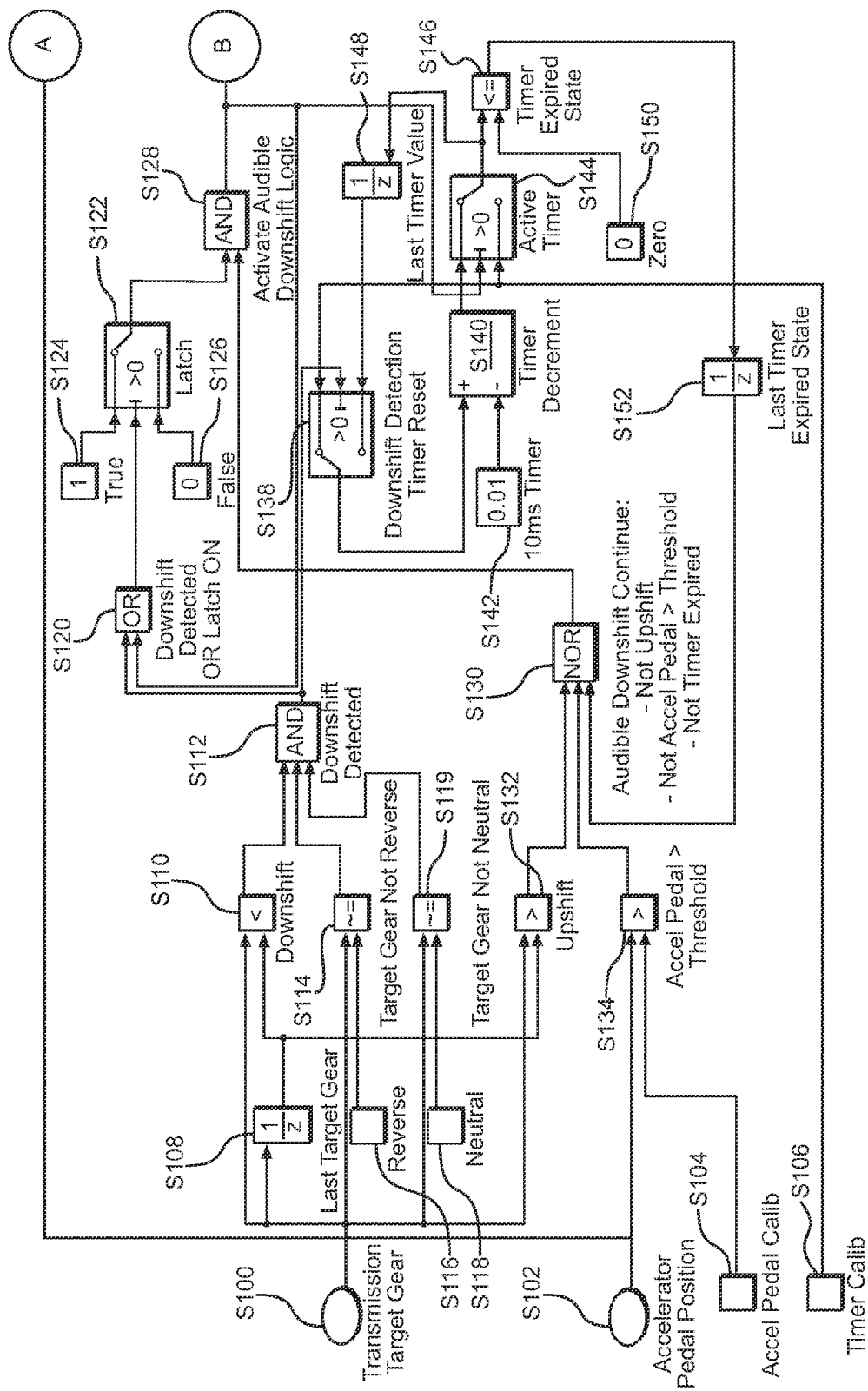
FIG. 4A is a logic diagram depicting an exemplary audible downshift activation algorithm in accordance with the disclosed subject matter.
Figure 4B:
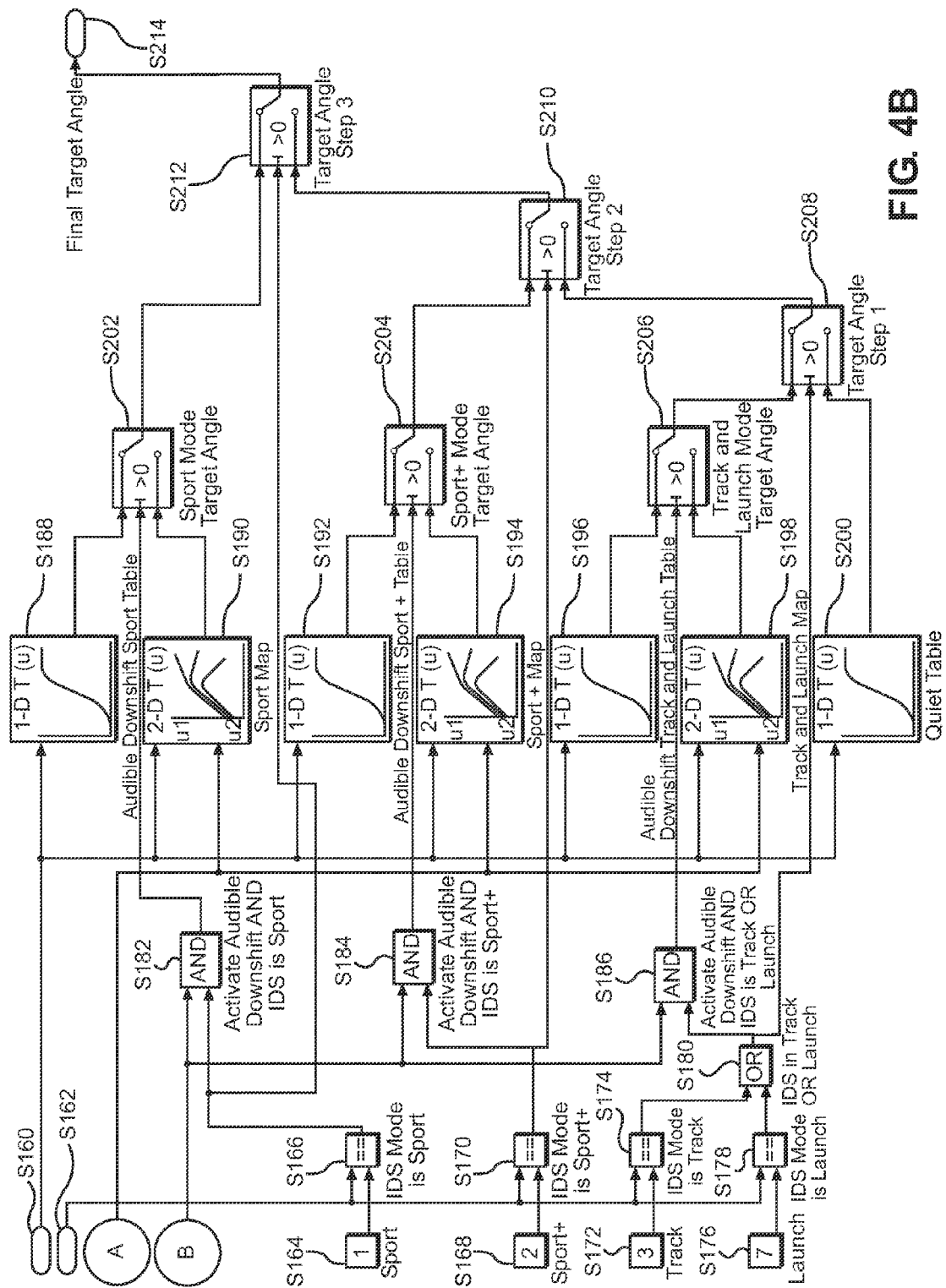
FIG. 4B is continuation of the logic diagram of FIG. 4A and further depicts an exemplary audible downshift algorithm using audible downshift tables in accordance with the disclosed subject matter.

FIG. 4A is a logic diagram depicting an exemplary audible downshift activation algorithm in accordance with the disclosed subject matter. FIG. 4B is a continuation of the logic diagram of FIG. 4A and further illustrates how the controller's logic selects (via an Audible Downshift activation logic in FIG. 4A) an Audible Downshift table if a downshift is detected, and this table remains active at least until: 1) a timer runs out (which is set in calibration), 2) an upshift is detected, or 3) the acceleration pedal is actuated above a certain threshold. Exemplary logic in FIG. 4B can be used by one or more algorithms in the controller 66 to determine the acceptable amount of engine sound to be transferred to the vehicle cabin 24. In other words, the opening and closing of the intake sound valve 69, which determines the amount of sound communicated to the vehicle cabin 24, is regulated based on the controller's sound response maps, and when in Audible Downshift activation, the sound response data tables.

The Audible Downshift tables (S188, S192, S196 in FIG. 4B) are designed to provide sufficient feedback during off throttle downshifts, and in particular to control the intake sound valve 69 (such as by opening and closing the valve) to transmit sufficient engine sound to the vehicle cabin 24 so that the vehicle occupants feel connected to the vehicle operation. In particular, the vehicle occupants can hear the downshift, which allows them to feel more connected to the vehicle by understanding exactly when the downshift has taken place.

In some embodiments, the controller 66 can include programmable logic circuits and/or pre-configured logic circuits for executing IDS functions. A memory within or operatively connected to the controller 66 can store information accessible by a processor (e.g., CPU, DSP, etc.) of the controller 66 including instructions and data for the IDS modes and the Intake Sound Controller that may be executed or otherwise used by the processor. The control logic (in this example, software instructions or computer program code), when executed by the controller 66, causes the controller 66 to perform the functions of the embodiments as described herein. In other words, controller's software logic (referred to as Audible Downshift) enhances engine sound response during off throttle downshifts by controlling the intake sound valve 69 based on the Audible Downshift tables (instead of the normal gear, IDS control map) when the Audible Downshift logic is active.

In the embodiments, there is a map for each IDS mode (e.g., Quiet, Sport, Sport Plus, Track) and gear position. When the Audible Downshift algorithm is not activated, the IDS sound responses can be governed by a separate map for each IDS mode. The Quiet mode may have a map for sound responses, or alternatively may operate with a closed intake sound valve 69 so that no sound response is transferred to the cabin 24. In each map, the X axis is an engine speed in RPM, the Y axis is the accelerator pedal position, and the Z axis is the target angle of the intake sound valve 69. When the Audible Downshift is activated for off throttle downshift events for the Sport and Track modes, the IDS sound responses are governed instead by a separate data table for each IDS mode. Each data table compares accelerator pedal position, engine speed in RPM, actual gear position, and IDS mode to provide a target angle for the intake sound valve 69.

The Audible Downshift logic activates when a downshift is detected and the accelerator pedal position is below a threshold position, and remains active until at least one of the conditions listed below occurs or a timer resets. The downshift timer resets every time a downshift is detected and expires after a predetermined time period, an upshift occurs, or an accelerator pedal position passes a threshold position. The criteria for detecting a downshift is based on a determination that at least: 1) the target gear value of the current CPU cycle in the controller 66 is less than the target gear value of the previous CPU cycle, 2) the target gear selection is not reverse, and 3) the target gear selection is not neutral.

FIGS. 4A-4B further illustrate an exemplary logic circuit that can be included in an exemplary algorithm that the controller 66 can execute in order to generate a signal indicative of an Audible Downshift activation. The exemplary logic circuit can provide the controller 66 with instructions determining a final target angle of the sound intake valve 69 during a downshift event using data from Audible Downshift tables and the logic illustrated in FIG. 4B. The input and output values for logic gates in FIGS. 4A and 4B can be either a logical zero (0) or a logical (1). Other input and output values for steps in the logic circuit can be actual values of a measured or intended application, for example a value of an angle of the intake sound valve 69.

In FIG. 4A, the controller 66 can begin the Audible Downshift activation logic algorithm at step S100 by receiving a transmission target gear input from the gear sensor 72 and at step S102 by receiving an accelerator pedal position input from the pedal position sensor 74. The controller 66 can also contain predetermined values of calibration values that can be used to disable an Audible Downshift activation. A first predetermined value includes receiving an input of an accelerator pedal calibration position at step S104 and receiving an input of a timer calibration value at input S106. In step S108 the controller 66 determines a value of the last target gear $Z^{-1}$ and inputs the last target gear value in logic block S110. In logic block S110 the controller 66 can compare the previous CPU cycle transmission target gear value S108 with the current CPU cycle transmission target gear value from input S100. If the current CPU cycle transmission target gear S100 is less than the previous CPU cycle transmission target gear value S108, then the logic block S110 determines that the transmission 20 is undergoing a downshift event and outputs a one (1) to an AND gate logic step S112, otherwise a downshift event has not occurred and the logic step S110 outputs a zero (0) to the AND gate logic step S112. In logic step S114, the controller 66 can determine whether the transmission 20 is targeting a reverse gear by receiving an input of the transmission target gear S100 and comparing to a reverse gear input S116. If the transmission target gear input S100 is approximately equal to a reverse gear input S116, then the logic step S114 outputs a zero (0) to the AND gate logic step S112, otherwise the transmission 20 is not targeting the reverse gear and the logic step S114 outputs a one (1) to the AND gate logic step S112. The controller 66 in logic step S119 can determine whether the transmission 20 is targeting the neutral gear by receiving an input of the transmission target gear S100 and comparing to a transmission neutral input S118. If the transmission target gear input S100 is approximately equal to the neutral input S118, then the logic step S119 outputs a zero (0) to the AND gate logic step S112, otherwise the transmission 20 target gear is not neutral and the logic step S119 outputs a one (1) to the AND gate logic step S112.

If the controller 66 determines that a downshift has occurred, the target gear is not reverse or neutral, then the AND gate logic step S112 outputs a one (1) as an input to an OR gate logic step S120, otherwise the AND gate logic step S112 outputs a zero (0) as an input to the OR gate logic step S120. The OR gate logic step S120 can also receive an input from feedback output of an AND gate logic step S128, where the controller 66 can determine whether to activate the Audible Downshift logic. If the OR gate logic step S120 receives true (one (1)) inputs from either or both of the outputs from the AND gate logic step S112 (that a downshift event is detected) and the AND gate logic step S128 (that the Audible Downshift logic is activated), then the OR gate logic step S120 will output a one (1) to the latch step S122. Once a true (one (1)) input from the OR gate logic step S120 is received by the latch step S122, the latch step S122 will latch to a true (one (1)) input S124 and output a one (1) to the AND logic gate step S128. Otherwise, if both the downshift event is not detected in the AND gate logic step S112 and the Audible Downshift logic is not activated in the AND gate logic step S128, the OR logic gate S120 will receive both inputs of zero (0) and, using OR gate logic, output a zero (0) to the latch step S122. When the latch step S122 receives a zero input, the latch moves to receive the false (zero (0)) input S126, and outputs a zero (0) to the AND gate logic step S128.

The controller 66 can send a second input to the AND gate logic step S128 from an output of a NOR logic gate step S130. The second input is a determination of three inputs: whether the accelerator pedal 76 is in a position greater than a threshold, whether an upshift event is occurring in the transmission 20, and whether a timer has expired. If any one of these three inputs are true, then the NOR logic gate step S130 will output a zero (0) to the AND gate logic step S128, causing the AND gate logic step S128 to output a zero (0), thereby not activating, or cancelling, the Audible Downshift logic.

The controller 66 can begin this determination at logic step S132. In step S108 the controller 66 determines a value of the last target gear $Z^{-1}$ and inputs the last target gear value in logic block S132. In the logic block S132 the controller 66 can compare the previous CPU cycle transmission target gear value with the current CPU cycle transmission target gear value from input S100. If the current CPU cycle transmission target gear value is greater than the previous CPU cycle transmission target gear value S108, then the logic block S132 determines that the transmission 20 is undergoing an upshift event and outputs a one (1) to the NOR gate logic step S130, otherwise an upshift event has not occurred and the logic step S132 outputs a zero (0) to the NOR gate logic step S130. In logic step S134 the controller 66 can compare the current accelerator position value from input S102 with an accelerator pedal calibration value from S104. If the accelerator pedal position is greater than a threshold set by the accelerator pedal calibration step S104, then the logic step 134 outputs a one (1) to the NOR gate logic step S130, otherwise the accelerator pedal position is less than the threshold and the logic step 134 outputs a zero (0) to the NOR gate logic step S130.

As discussed above, a third input to the NOR gate logic step S130 is from the controller 66 determining whether an Audible Downshift timer has expired. A timer of the controller 66 is intended to reset and initiate for each downshift event. An expired timer is intended to stop the Audible Downshift logic. The timer function can be calibrated in the timer calibration input step S106. The controller 66 can determine whether to reset the timer in step S138 using a downshift detection timer reset latch. The downshift detection timer reset latch step S138 can receive an output from the AND gate logic step S112. If the output from the AND gate logic step S112 is greater than zero (e.g., a one (1)) then a downshift event is detected and the timer is reset for a time input from the calibration in step S106. The timing function counts down in step S140 in 10 ms increments input from step S142. However, the time decrement is merely exemplary and alternative embodiments can include configurations of any desired time increment. Each decrement value in the timer function can be output to an active timer latch step S144 for every clock cycle. The active timer latch step S144 receives an input from the AND gate logic step S128. The controller 66 can determine if the input from the AND gate logic step S128 is greater than zero (e.g. a one (1)), then the Audible Downshift sound response algorithm is activated, upon which the timer resets and the latch step S144 outputs the timer calibration value from step S106 as input to the timer expired state logic step S146. If the controller 66 determines the input from the AND gate logic step S128 is equal to zero (0), then the Audible Downshift logic function is not activated, upon which the timer stops counting and the active timer latch step S144 outputs the timer calib S106 as input to the timer expired state logic step S146. The controller 66 can output the timer value from the active timer latch step S144 to a last timer value $Z^{-1}$ in step S148, which converts the value to a last time value, which is fed back to the downshift detection time reset latch step S138. If the input to the latch step S138 from the AND gate logic step S112 is zero (0) (e.g., a downshift event is not detected), then the controller 66 can switch the latch in the latch step S138 from the timer calibration input S106 to receive the last timer value from step S148 in order to continue decrementing the timer in the next clock cycle.

Returning to the active timer latch step S144, the controller 66 can output the current timer value to the timer expired state step S146 and compare if the current timer value is either less than or equal to a zero (0) value from input step S150. If the controller 66 determines the current time value is greater than zero (0), then the timer is not expired, and the timer expired state logic step S146 outputs a logical zero (0). If the controller 66 determines the current time value is less than or equal to zero (0), the timer is expired and the timer expired state logic step S146 outputs a logical one (1). In logic step S152, the controller 66 then determines the last timer expired state $Z^{-1}$ and outputs a one (1) or zero (0) according to the last timer expired state status to the input of the NOR gate logic step S130. At the NOR gate logic step S130, the controller 66 can use NOR logic to output a one (1) to the AND gate logic step S128 if all inputs to the NOR gate logic step S130 are zero (0), (e.g., input from step S132 that an upshift has not occurred, input from step S134 that the accelerator pedal is not above a threshold, and input from step S152 that the last timer expired state is not an expired state (meaning the timer has not expired)). If, at the NOR gate logic step S130, the controller 66 determines at least one input to the NOR gate logic step S130 is a one (1), (e.g., input from step S132 that an upshift has occurred, input from step S134 that the accelerator pedal is above a threshold, or input from step S152 that the last timer expired state is an expired state (meaning the timer has expired)), then the controller uses NOR logic to output a zero (0) to the AND gate logic step S128.

Returning to the activate audible downshift logic step S128, once the controller 66 determines that both inputs to the AND gate logic step S128 have been received, the controller 66 applies AND logic to the inputs. If each input from the latch step S122 and the NOR gate logic step S130 are one (1), the controller 66 outputs a one (1), otherwise if either or both inputs are a zero (0), the controller 66 outputs a zero (0).

III. Exemplary Algorithm for Application of Audible Downshift Tables and Maps FIG. 4B is continuation of the logic diagram of FIG. 4A and further depicts an exemplary audible downshift algorithm using audible downshift tables in accordance with the disclosed subject matter. Exemplary logic in FIG. 4B can be used by one or more algorithms in the controller 66 to determine the acceptable amount of engine sound to be transferred to the vehicle cabin 24. In other words, the opening and closing of the intake sound valve 69, which determines the amount of sound communicated to the vehicle cabin 24, is regulated based on configurable sound response tables while the Audible Downshift algorithm is activated.

Generally, in the initial stage of the algorithm in FIG. 4B, the controller 66 can determine which IDS mode has been selected by a vehicle operator, and therefore which sound response table should be selected to correspond with the IDS mode selection. In the second stage of the algorithm in FIG. 4B, the downshift tables can be selected and applied by the controller 66 that determine, in the third stage, a final target angle of the intake sound valve 69.

In input step S160, the controller 66 can receive data values of an engine speed from the engine speed sensor 82. Further, in an input step S162, the controller 66 can receive input of an IDS mode control that has been selected by a vehicle operator via the IDS mode selector 78. In logic step S166, the controller 66 can determine if the IDS mode input from step S162 is the Sport mode by comparing the input with a standard Sport mode input from step S164. If the two inputs match, then the logic step S166 outputs a one (1) to an AND gate logic step S182 to select the Sport mode maps S190, otherwise the step S166 outputs a zero (0) and the logic process proceeds to step S170. Proceeding to logic step S170, the controller 66 can determine if the IDS mode input from step S162 is the Sport Plus mode by comparing the input with a standard Sport Plus mode input from step S168. If the two inputs match, then the logic step S170 outputs a one (1) to an AND gate logic step S184 to select the Sport Plus mode maps S194, otherwise the step S170 outputs a zero (0) and the logic process proceeds to step S174. In logic step S174, the controller 66 can determine if the IDS mode input from step S162 is the Track mode by comparing the input with a standard Track mode input from step S172. If the two inputs match, then the logic step S174 outputs a one (1) to an OR gate logic step S180, otherwise the step S174 outputs a zero (0) and the logic process proceeds to step S178. Proceeding to logic step S178, the controller 66 can determine if the IDS mode input from step S162 is the Launch mode by comparing the input with a standard Launch mode input from step S176. If the two inputs match, then the logic step S178 outputs a one (1) to the OR gate logic step S180, otherwise the step S178 outputs a zero (0) and the process proceeds to step S180. Proceeding to logic step S180, the controller 66 can determine if the IDS mode selected is Track and Launch mode by utilizing OR logic in the OR gate logic step S180. If either or both inputs to the OR gate logic step S180 from the logic step S174 for Track mode selection and logic step S178 for Launch mode selection are one (1), the OR gate logic step S180 outputs a one (1) to the AND gate logic step S186 to select Track and Launch mode maps S198, otherwise the step S180 outputs a zero (0).

In addition to the IDS mode selection inputs described above, each of the AND gate logic steps S182, S184, S186 for Audible Downshift mode activation also receive an input from the AND gate logic step S128 that is required for the controller 66 to activate the Audible Downshift logic for the Sport, Sport Plus, Track, or Launch modes. At step S182, if the input from the AND gate logic step S128 is a one (1) (to activate the Audible Downshift logic), and the IDS is Sport mode from logic step S166, then the controller 66 can apply AND logic and activate the Audible Downshift logic for the Sport mode and output a one (1) to the Sport mode target angle latch step S202. Additionally, in step S212, if an input of one (1) is received from the IDS Sport mode logic step S166, then the controller 66 switches the latch (or alternative maintains the latch) to receive output from the Sport mode target angle latch step S202. However, if the input from the AND gate logic step S128 is a zero (0), then the Audible Downshift logic is not activated for the IDS Sport mode and the AND gate logic step S182 outputs a zero to the Sport mode target angle latch step S202. If the Audible Downshift logic is activated by the controller 66 for the IDS Sport mode in step S182, then the latch step S202 receives an input from the engine speed input step S160 that is applied to an Audible Downshift Sport mode table at step S188 to determine a Sport mode target angle for the intake sound valve 69. An output from the Sport mode target angle latch step S202 of the intake sound valve target angle is transferred to the target angle latch step S212, which outputs the final target angle for the intake sound valve 69 in step S214. If the Audible Downshift logic is not activated by the controller 66 for the IDS Sport mode in step S182, then a Sport mode map S190 for the intake sound valve angle becomes active as the latch step S202 switches to receive an input from the engine speed input step S160 and the accelerator pedal position input S102 applied to the Sport mode map S190. An output from the Sport mode target angle latch step S202 of the intake sound valve target angle from the Sport mode map S190 is transferred to the target angle latch step S212, which outputs the final target angle for the intake sound valve 69 in step S214.

Additionally, if the Audible Downshift logic is not activated by the controller 66 for the IDS Sport mode in step S182, then the controller 66 proceeds to processes for step S184 and switches the latch logic in the latch step S212 to receive an input from a target angle latch step S210 that receives target sound intake valve angle data from the IDS Sport Plus mode logic, the IDS Track mode logic, the IDS Launch mode logic, or the IDS Quiet mode logic.

Proceeding to step S184, if the input from the AND gate logic step S128 is a one (1) (to activate the Audible Downshift logic), and the IDS is Sport Plus mode from logic step S170, then the controller 66 can apply AND logic and activate the Audible Downshift logic for the Sport Plus mode and output a one (1) to the Sport Plus mode target angle latch step S204. Additionally, in step S210, if an input of one (1) is received from the IDS Sport Plus mode logic step S170, then the controller 66 switches the latch (or alternatively maintains the latch) to receive output from the Sport Plus mode target angle latch step S204. However, if the input from the AND gate logic step S128 is a zero (0), then the Audible Downshift logic is not activated for the Sport Plus mode and the AND gate logic step S184 outputs a zero (0) to the Sport Plus mode target angle latch step S204. If the Audible Downshift logic is activated by the controller 66 for the Sport Plus mode in step S184, then the latch step S204 receives an input from the engine speed input step S160 that is applied to an Audible Downshift Sport Plus table at step S192 to determine a Sport Plus mode target angle for the intake sound valve 69. An output from the Sport Plus mode target angle latch step S204 of the intake sound valve target angle is transferred to the target angle latch step S210, which is subsequently transferred to the target angle latch step S212, which thereafter outputs the final target angle for the intake sound valve 69 in step S214.

If the Audible Downshift logic is not activated by the controller 66 for the Sport Plus mode in step S184, then a Sport Plus mode map S194 for the intake sound valve angle becomes active as the latch step S204 switches to receive an input from the engine speed input step S160 and the accelerator pedal position input S102 applied to the Sport Plus mode map S194. An output from the Sport Plus mode target angle latch step S204 of the intake sound valve target angle from the Sport Plus mode map S194 is transferred to the target angle latch step S210, which is subsequently transferred to the target angle latch step S212, which thereafter outputs the final target angle for the intake sound valve 69 in step S214.

Additionally, if the Audible Downshift logic is not activated by the controller 66 for the Sport Plus mode in step S182, then the controller 66 proceeds to processes for step S180 and switches the latch in the latch step S210 to receive an input from a target angle latch step S208 that receives target sound intake valve angle data from the Track, Launch, and Quiet mode logic operations.

Proceeding to step S186, if the input from the AND gate logic step S128 is a one (1) (to activate the Audible Downshift process), and the IDS mode is Track or Launch from logic step S180, then the controller 66 can apply AND logic and activate the Audible Downshift logic for the Track and Launch mode and output a one (1) to the Track and Launch mode target angle latch step S206. Additionally, in step 208, if an input of one (1) is received from the Track and Launch mode logic step S180, then the controller 66 switches the latch (or alternatively maintains the latch) to receive output from the Track and Launch mode target angle latch step S206. However, if the input from the AND gate logic step S128 is a zero (0), then the Audible Downshift logic is not activated for the Track and Launch mode and the AND gate logic step S186 outputs a zero (0) to the Track and Launch mode target angle latch step S206. If the Audible Downshift logic is activated by the controller 66 for the IDS Track and Launch mode in step S186, then the latch step S206 receives an input from the engine speed input step S160 that is applied to an Audible Downshift Track and Launch table S196 to determine a Track and Launch mode target angle for the intake sound valve 69. An output from the Track and Launch mode target angle latch step S206 of the intake sound valve target angle is transmitted to the target angle latch step S208, which is subsequently transmitted as an input to the target angle latch step S210, which thereafter transmits the Track and Launch mode target angle for the intake sound valve 69 as input to the final target angle input in step S214 via the target angle latch step S212.

If the Audible Downshift logic is not activated by the controller 66 for the IDS Track and Launch mode in step S186, then a Track and Launch mode map S198 to determine the intake sound valve angle are active, as the latch step S206 switches to receive an input from the engine speed input step S160 and the accelerator pedal position input S102 applied to the Track and Launch mode map S198 to find a target angle for the intake sound valve 69. An output from the Track and Launch mode target angle latch step S206 of the intake sound valve target angle determined from the Track and Launch mode map S198 is transmitted and input to the target angle latch step S208, which is subsequently transmitted to the input for the final target angle of the intake sound valve 69 in step S214 via the target angle latch step S210 and the target angle latch step S212.

If none of the Sport, Sport Plus, or Track and Launch modes are selected by a vehicle operator via the IDS mode selector 78, then the controller 66 defaults to the Quiet mode and switches the latch in the latch step S208 to receive an input for the Quiet mode using a Quiet mode table in step S200, if it is desired to determine a target angle for the intake sound valve 69. The target angle can be transmitted as input to final target angle input step S214 via steps S208, S210 and S212. In an alternative embodiment, the Quiet mode final target angle for the sound intake valve 69 is always closed.

V. Plots of Audible Downshift Operations Over Time

FIGS. 5 through 8 depict plots of various aspects of the processes of the embodiment for the logic algorithm, described above, applied to operation of the vehicle 12.

FIG. 5 is a series of time-coordinated graphs depicting timer resets after each of a series of downshift events are detected in accordance with the disclosed subject matter. Plot 88 depicts a series of downshift events over time with actual gear lines 94 and target gear lines 96 decreasing at each downshift event. In plot 88, and all plots depicted in FIGS. 6 through 8, a plot line 94 represents actual transmission gear changes over time and plot line 96 represents target transmission gear changes over time. Plot 90 depicts status of the Audible Downshift timer S142 and Audible Downshift detection timer reset S138, described in relation to FIG. 4A. The plot illustrates that the Audible Downshift timer S142 resets 89 at the initiation of each downshift 96 depicted in plot 88. Plot 92 depicts a logical data chart aligned to plots 88 and 90 over time. Audible Downshift logic states over time are illustrated as logic diagram 91. The logic diagram 91 illustrates logical states of Audible Downshift logic between zero (0) for a Normal Map Active and one (1) for Audible Downshift Table Active. In plot 92, as the first downshift is detected 93, the Audible Downshift logic changes state from Normal Map Active at zero (0) to Audible Downshift Table Active at one (1). This activates logic to use an Audible Downshift table, as described in FIG. 4B, to control the angle of the intake sound valve 69. After a final downshift detected 93, the Audible Downshift timer S142 expires in plot 90, the Audible Downshift logic stops, and the ISC system returns to Normal Map Active logic to control the angle of the intake sound valve 69.

FIG. 6 is a series of time-coordinated graphs depicting Audible Downshift timer expiration periods stopping or cancelling Audible Downshift logic. Plot 98 depicts a series of downshift events, with actual gear lines 94 and target gear lines 96 decreasing at each downshift event. Plot 100 depicts status of the Audible Downshift timer S142, described in FIG. 4A. The plot 100 illustrates that the Audible Downshift timer expires at zero (0), where the threshold line 101 represents an Audible Downshift timer threshold. The Audible Downshift timer S142 then resets 89 regardless of the initiation of each downshift 96 depicted in plot 98. Plot 102 depicts a logical data chart aligned to plots 98 and 100 over time. Audible Downshift logic states over time are illustrated as logic diagram 91. In plot 102, as the first downshift is detected 93, the Audible Downshift logic rises from Normal Map Active at zero (0) to Audible Downshift Table Active at one (1). The Audible Downshift logic then activates to use an Audible Downshift table, as described in FIG. 4B, to control the angle of the intake sound valve 69. At each Audible Downshift timer reset 89 where the time reaches the Timer Expired Threshold line 101 in plot 100, the Audible Downshift logic stops 103 and the ISC system returns to Audible Downshift maps to control the angle of the intake sound valve 69 until the next downshift event occurs, thereupon the Audible Downshift table is active to control the position of the intake sound valve 69 during the off throttle downshift event. Additionally, the final downshift 96 in plot 98 occurs sometime after the previous Audible Time reset 89, which causes the Audible Downshift logic diagram 91 to fall from one (1) to zero (0) until the final downshift is detected 93.

Figure 7:
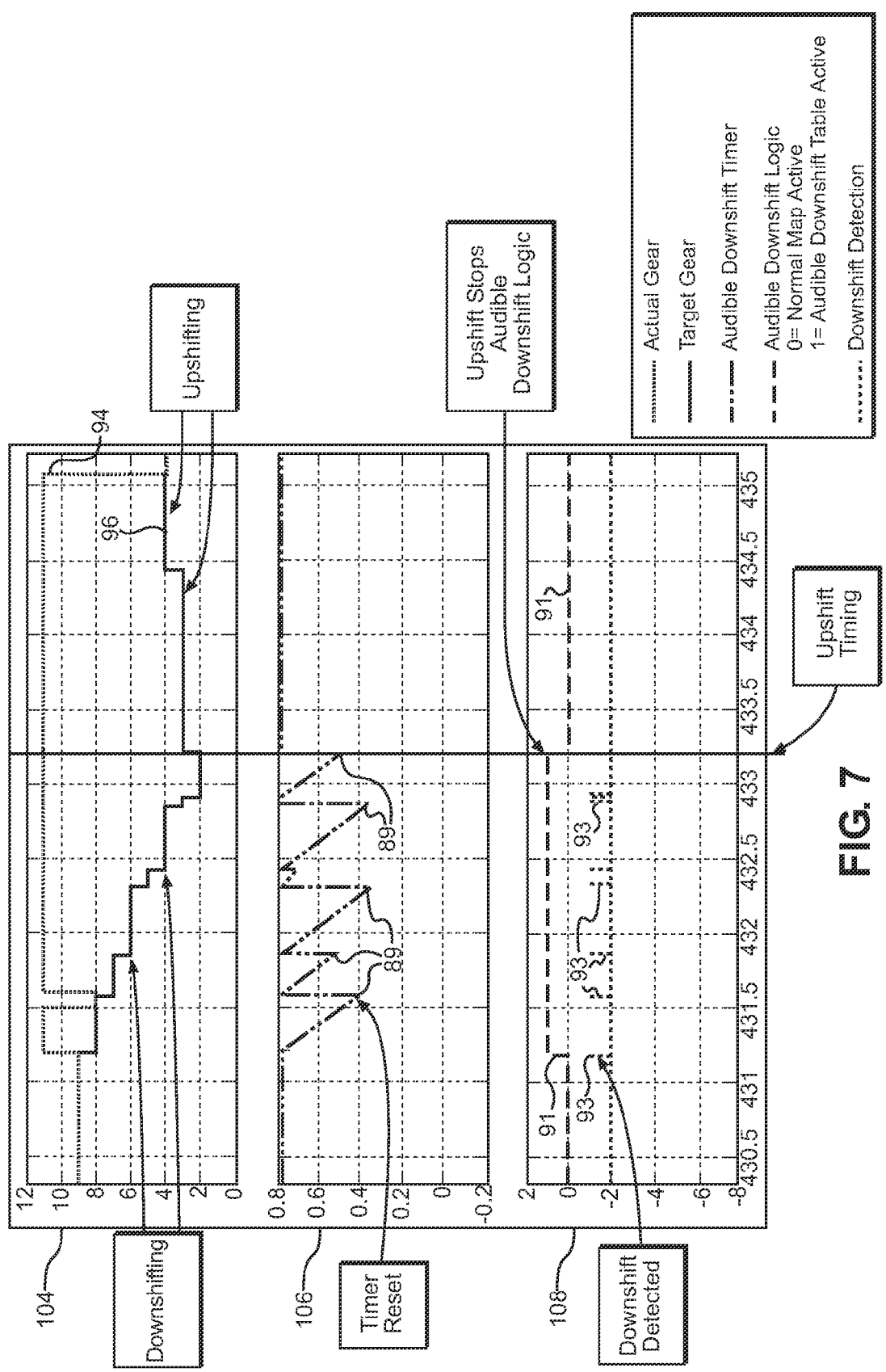
FIG. 7 is a series of time-coordinated graphs depicting upshift events stopping audible downshift processes.

FIG. 7 is a series of time-coordinated graphs depicting upshift events stopping Audible Downshift logic after a series of downshifting events. Plot 104 depicts a series of downshift events on the left side of the upshift timing line, followed by a series of upshift events on the right side of the upshift timing line, with actual gear lines 94 and target gear lines 96 decreasing at each downshifting event and then increasing at each upshifting event. Plot 106 depicts status of the Audible Downshift timer S142, described in FIG. 4A. The plot illustrates that the downshift timer resets 89 after the initiation of each downshift 96 depicted in plot 104, but the logic stops after initiation of upshift events corresponding to data on the right side of the upshift timing line. Plot 108 depicts a logical data chart aligned to plots 104 and 106 over time. Audible Downshift logic states over time are illustrated as logic diagram 91. In plot 108, as the first downshift is detected 93, the Audible Downshift logic activates, depicted as a rise to one (1) in logic diagram 91, to use an Audible Downshift table, as described in FIG. 4B, to control the angle of the intake sound valve 69. The Audible Downshift logic continues until the upshift timing event, after which the upshift stops the Audible Downshift logic. The logic diagram 91 then falls to zero (0), and the Audible Downshift logic returns to Audible Downshift maps to control the angle of the intake sound valve 69 until the next downshift event occurs.

Figure 8:
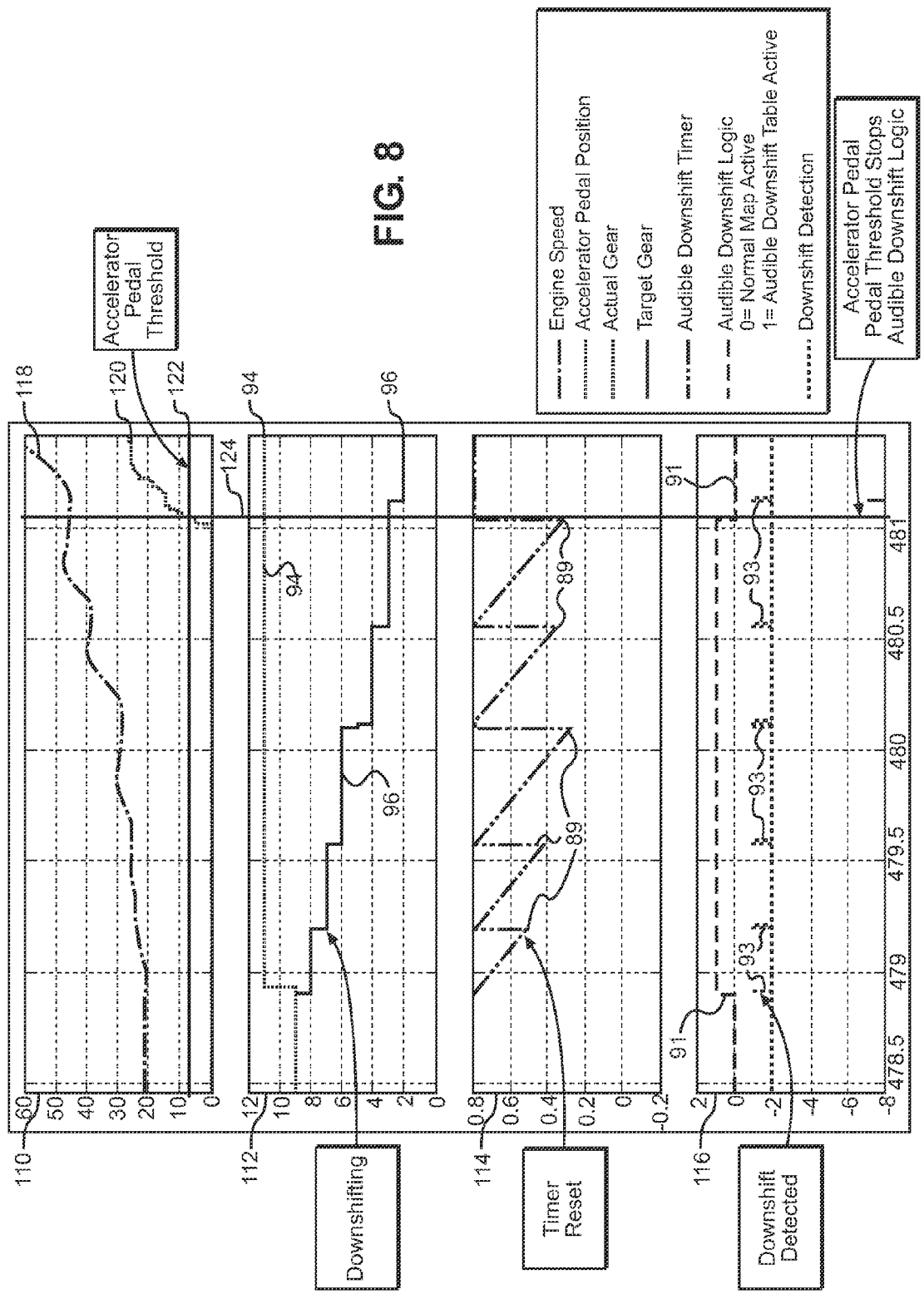
FIG. 8 is a series of time-coordinated graphs depicting events where an accelerator pedal depression beyond a threshold stops audible downshift processes.

FIG. 8 is a series of time-coordinated graphs depicting events where an accelerator pedal depression beyond a threshold stops audible downshift processes. The plot 110 depicts a plot line 118 representing engine speed of the vehicle 12 and a plot line 120 representing accelerator pedal position over time. Plot 112 depicts a series of downshift events over time, with actual gear lines 94 and target gear lines 96 decreasing at each downshift event. Plot 114 depicts status of the Audible Downshift timer S142, which is normally reset 89 at the initiation of each downshift 96 in plot 112. Plot 116 depicts the logic diagram 91 rising or falling between zero (0) for a Normal Map Active and one (1) for Audible Downshift Table Active. In plot 116, as the first downshift is detected 93, the Audible Downshift logic rises from Normal Map Active at zero (0) to Audible Downshift Table Active at one (1). This activates logic to use an Audible Downshift table, as described in FIG. 4B, to control the angle of the intake sound valve 69. Plot line 122 represents a threshold accelerator pedal position which, when crossed by the actual pedal position 120, stops or cancels the Audible Downshift logic. A timing line 124 is illustrated across all plots 110, 112, 114, and 116 to illustrate the effects of the accelerator pedal threshold logic. When the actual accelerator pedal position 120 crosses threshold 122, even though the transmission is still undergoing downshift events shown in plot 112, the Audible Downshift logic stops, as shown in plot 116 and the Audible Downshift logic diagram 91 returns to zero (0). In plot 114, the Audible Downshift timer resets after the timing line 124 even though the downshift events 96 in plot 112 continue to occur.

VI. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of an ISC system increasing engine sound in a vehicle cabin during off-throttle downshift events for an automatic or manual transmission by adjusting a sound intake valve connected to the intake air conduit ahead of the intake throttle. However, embodiments are intended to include or otherwise cover any aspect of ISC sound control during off throttle downshift events for a transmission. For example, the disclosed systems and methods can be used in other shifting events and for other systems for increasing engine sound in a vehicle cabin.

The storage device is disclosed as to form a part of or otherwise share the same unitary structure as the controller. However, the storage device can be formed as a separate and discrete component from the controller.

The disclosed controller can include or otherwise cover known, related art and later developed processors and computer programs implemented by processors used to implement the disclosed operations.

Exemplary embodiments of the controllers are intended to cover all software or computer programs capable of enabling processors to implement the above operations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

These computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), Controller Area Networks (CANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

While the subject matter has been described in detail with reference to exemplary embodiments thereof, it will be apparent to one skilled in the art that various changes can be made, and equivalents employed, without departing from the scope of the invention. All related art references discussed in the above Background Section are hereby incorporated by reference in their entirety.

What is claimed is:

1. A control system for use with a sound controller that is configured to transmit sounds to a passenger cabin of a vehicle, the vehicle including a transmission having multiple gears and being controllable to select a different gear resulting in either an upshift or a downshift, and an accelerator pedal that is configured to be manually actuated to control a throttle valve to regulate a supply of air to an engine, the vehicle engine being operable in multiple different modes and engine speeds, the control system comprising:
 a shift sensor configured to output data indicative of a transmission target gear;
 an accelerator pedal sensor that is configured to output data indicative of a position of the accelerator pedal; and
 a controller configured to control operation of the sound controller in accordance with a sound control logic that is based on vehicle engine mode, transmission target gear selection, accelerator pedal position, and vehicle engine speed, the controller also being configured to control operation of the sound controller in accordance with an audible downshift logic that is separate from the sound control logic and is specifically tailored to only perform the following operation: if the transmission target gear corresponds to a downshift of the vehicle transmission and the accelerator pedal position is not above the predetermined threshold, then the audible downshift logic controls the sound controller to enhance engine sound transmitted to the passenger cabin.

2. The control system according to claim 1, wherein the sound controller includes a sound intake assembly that is connected to an intake conduit of the throttle valve, the sound intake assembly including an intake sound valve that is controllable by the controller to increase or decrease an amount of intake air passed from the intake conduit to an exit end of the intake sound valve.

3. The control system according to claim 2, wherein the sound controller includes a sound processor that is connected to the exit end of the intake sound valve by an intermediary conduit, the sound processor having a diaphragm that communicates vibrations generated by the air passed through the intake sound valve to the passenger cabin of the vehicle, such that controlling the intake sound valve increases or decreases the vibrations communicated to the passenger cabin and thereby acts as a volume control for sound supplied to the passenger cabin.

4. The control system according to claim 1, wherein the controller utilizes sound control maps and audible downshift tables to implement the sound control logic and the audible downshift logic used to control operation of the sound controller, the tables and the maps including data relating to vehicle engine mode, transmission target gear selection, accelerator pedal position, and vehicle engine speed.

5. The control system according to claim 4, wherein, if the downshift sensor detects a downshift of the vehicle transmission and the accelerator pedal sensor detects that the accelerator pedal is not actuated above the predetermined threshold, the controller controls operation of the sound controller in accordance with the audible downshift logic until a predetermined period expires, a transmission upshift occurs, or the accelerator pedal sensor detects that the accelerator pedal is actuated above the predetermined threshold.

6. The control system according to claim 5, wherein the controller uses the audible downshift tables to control an intake sound valve to increase sound transmitted to the passenger cabin of the vehicle for a period subsequent to the downshift sensor detecting a downshift of the vehicle transmission and the accelerator pedal sensor detecting that the accelerator pedal is not actuated above the predetermined threshold.

7. The control system according to claim 6, wherein the sound control maps and the audible downshift tables include a separate table with specific data for each of the multiple different vehicle engine modes.

8. The control system according to claim 7, wherein the multiple different vehicle engine modes include a track mode, a sport plus mode, a sport mode, and a quiet mode, the controller only utilizing the audible downshift tables during the track mode, the sport plus mode, and the sport mode.

9. The control system according to claim 1, wherein the downshift sensor is configured to detect a downshift of the vehicle transmission based on whether a target gear is lower than a most recent previously selected gear, the target gear is not reverse, and the target gear is not neutral.

10. The control system according to claim 1, wherein the controller includes programmable logic circuits.

11. An acoustic system for use with a vehicle defining a passenger cabin, the vehicle including a transmission having multiple gears and being controllable to select a different gear resulting in either an upshift or a downshift, and an accelerator pedal that is configured to be manually actuated to control a throttle valve to regulate a supply of air to an engine, the vehicle engine being operable in multiple different modes and engine speeds, the acoustic system comprising:
 a sound controller that is configured to transmit sounds to a passenger cabin of a vehicle; and
 a control system that includes:
  a downshift sensor configured to detect a downshift of the vehicle transmission;
  an accelerator pedal input that is configured to detect whether an accelerator pedal actuation value is above a predetermined threshold; and
  a controller configured to control operation of the sound controller in accordance with a sound control logic that is based on vehicle engine mode, transmission target gear selection, accelerator pedal position, and vehicle engine speed, the controller also being configured to control operation of the sound controller in accordance with an audible downshift logic that is separate from the sound control logic and is specifically tailored to only perform the following operation: if the downshift sensor detects a downshift of the vehicle transmission and the accelerator pedal sensor detects that the accelerator pedal is not actuated above the predetermined threshold, then the audible downshift logic controls the sound controller to enhance engine sound transmitted to the passenger cabin.

12. The acoustic system according to claim 11, wherein the sound controller includes a sound intake assembly that is connected to an intake conduit of the throttle valve, the sound intake assembly including an intake sound valve that is controllable by the controller to increase or decrease an amount of intake air passed from the intake conduit to an exit end of the intake sound valve.

13. The acoustic system according to claim 12, wherein the sound controller includes a sound processor that is connected to the exit end of the intake sound valve by an intermediary conduit, the sound processor having a diaphragm that communicates vibrations generated by the air passed through the intake sound valve to the passenger cabin of the vehicle, such that controlling the intake sound valve increases or decreases the vibrations communicated to the passenger cabin and thereby acts as a volume control for sound supplied to the passenger cabin.

14. The acoustic system according to claim 11, wherein the controller utilizes sound control maps and audible downshift tables to implement the sound control logic and the audible downshift logic used to control operation of the sound controller, the tables and the maps including data relating to vehicle engine mode, transmission target gear selection, accelerator pedal position, and vehicle engine speed.

15. The acoustic system according to claim 14, wherein, if the downshift sensor detects a downshift of the vehicle transmission and the accelerator pedal sensor detects that the accelerator pedal is not actuated above the predetermined threshold, the controller controls operation of the sound controller in accordance with the audible downshift logic until a predetermined period expires, a transmission upshift occurs, or the accelerator pedal sensor detects that the accelerator pedal is actuated above the predetermined threshold.

16. The acoustic system according to claim 15, wherein the controller uses the audible downshift tables to control an intake sound valve to increase sound transmitted to the passenger cabin of the vehicle for a period subsequent to the downshift sensor detecting a downshift of the vehicle transmission and the accelerator pedal sensor detecting that the accelerator pedal is not actuated above the predetermined threshold.

17. The acoustic system according to claim 16, wherein the sound control maps and the audible downshift tables include a separate table with specific data for each of the multiple different vehicle engine modes.

18. The acoustic system according to claim 17, wherein the multiple different vehicle engine modes include a track mode, a sport plus mode, a sport mode, and a quiet mode, the controller only utilizing the audible downshift tables during the track mode, the sport plus mode, and the sport mode.

19. The acoustic system according to claim 11, wherein the downshift sensor is configured to detect a downshift of the vehicle transmission based on whether a target gear is lower than a most recent previously selected gear, the target gear is not reverse, and the target gear is not neutral, and the controller includes programmable logic circuits.

20. A method of transmitting sounds to a passenger cabin of a vehicle using a sound controller, the vehicle including a transmission having multiple gears and being controllable to select a different gear resulting in either an upshift or a downshift, and an accelerator pedal that is configured to be manually actuated to control a throttle valve to regulate a supply of air to an engine, the vehicle engine being operable in multiple different modes and engine speeds, the method comprising:
  detecting a downshift of the vehicle transmission;
  detecting whether the accelerator pedal is actuated above a predetermined threshold;
  controlling operation of the sound controller in accordance with a sound control logic that is based on vehicle engine mode, transmission target gear selection, accelerator pedal position, and vehicle engine speed; and
  controlling operation of the sound controller in accordance with an audible downshift logic that is separate from the sound control logic and is specifically tailored to only perform the following operation: if the downshift sensor detects a downshift of the vehicle transmission and the accelerator pedal sensor detects that the accelerator pedal is not actuated above the predetermined threshold, then the audible downshift logic controls the sound controller to enhance engine sound transmitted to the passenger cabin.

* * * * *